US011503000B2

(12) United States Patent
Lal et al.

(10) Patent No.: US 11,503,000 B2
(45) Date of Patent: Nov. 15, 2022

(54) TECHNOLOGIES FOR ESTABLISHING SECURE CHANNEL BETWEEN I/O SUBSYSTEM AND TRUSTED APPLICATION FOR SECURE I/O DATA TRANSFER

(71) Applicant: Intel Corporation, Santa Clara, CA (US)

(72) Inventors: Reshma Lal, Hillsboro, OR (US); Luis S. Kida, Beaverton, OR (US); Soham Jayesh Desai, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 343 days.

(21) Appl. No.: 16/369,303

(22) Filed: Mar. 29, 2019

(65) Prior Publication Data
US 2019/0230067 A1    Jul. 25, 2019

(51) Int. Cl.
| G06F 13/20 | (2006.01) |
| G06F 21/60 | (2013.01) |
| H04L 9/40 | (2022.01) |
| H04L 67/00 | (2022.01) |
| G06F 21/57 | (2013.01) |
| H04L 9/08 | (2006.01) |

(52) U.S. Cl.
CPC .......... *H04L 63/0428* (2013.01); *G06F 13/20* (2013.01); *G06F 21/575* (2013.01); *G06F 21/606* (2013.01); *H04L 9/083* (2013.01); *H04L 67/34* (2013.01)

(58) Field of Classification Search
CPC ..... H04L 63/0428; H04L 9/083; H04L 67/34; G06F 13/20; G06F 21/575; G06F 21/606; G06F 21/60
See application file for complete search history.

(56) References Cited

U.S. PATENT DOCUMENTS

| 9,916,129 B1* | 3/2018 | Ahmad | ................... G06F 13/28 |
| 2016/0364343 A1* | 12/2016 | Case | ..................... H04L 9/0637 |
| 2017/0024570 A1* | 1/2017 | Pappachan | ............ G06F 21/602 |
| 2017/0171194 A1* | 6/2017 | Durham | ................. G06F 13/28 |

* cited by examiner

*Primary Examiner* — Theodore C Parsons
*Assistant Examiner* — Howard H. Louie
(74) *Attorney, Agent, or Firm* — Jaffery Watson Mendonsa & Hamilton LLP (57) ABSTRACT

Technologies for secure I/O data transfer includes a compute device, which includes a processor to execute a trusted application, an input/output (I/O) device, and an I/O subsystem. The I/O subsystem is configured to establish a secured channel between the I/O subsystem and a trusted application running on the compute device, and receive, in response to an establishment of the secured channel, I/O data from the I/O device via an unsecured channel. The I/O subsystem is further configured to encrypt, in response to a receipt of the I/O data, the I/O data using a security key associated with the trusted application that is to process the I/O data and transmit the encrypted I/O data to the trusted application via the secured channel, wherein the secured channel has a data transfer rate that is higher than a data transfer rate of the unsecured channel between the I/O device and the I/O subsystem.

14 Claims, 5 Drawing Sheets

TECHNOLOGIES FOR ESTABLISHING SECURE CHANNEL BETWEEN I/O SUBSYSTEM AND TRUSTED APPLICATION FOR SECURE I/O DATA TRANSFER

BACKGROUND

Input data from an input/output (I/O) device to a software application of a system may have high security sensitivity and need to be protected from being stolen by a rogue application in the system. For example, a digital assistant may capture user's voice by an I/O device (e.g., microphone), which may have privacy sensitivity information and may require or preferred to be protected as the voice data gets transferred from the I/O device to an application running inside a trusted execution environment (TEE). In some cases, a digital assistant provider may opt for a service model in which a device or software running on the device may be offered by multiple third-party vendors. This may increase a number of vendors and the software, which is not necessarily trusted by the user, that the user has to trust to access the privacy sensitivity information. Additionally, in order to perform a secure I/O with the TEE, the TEE may authenticate and verify the identity of the I/O device. However, not all I/O devices have encryption capability to encrypt I/O data to enable security.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
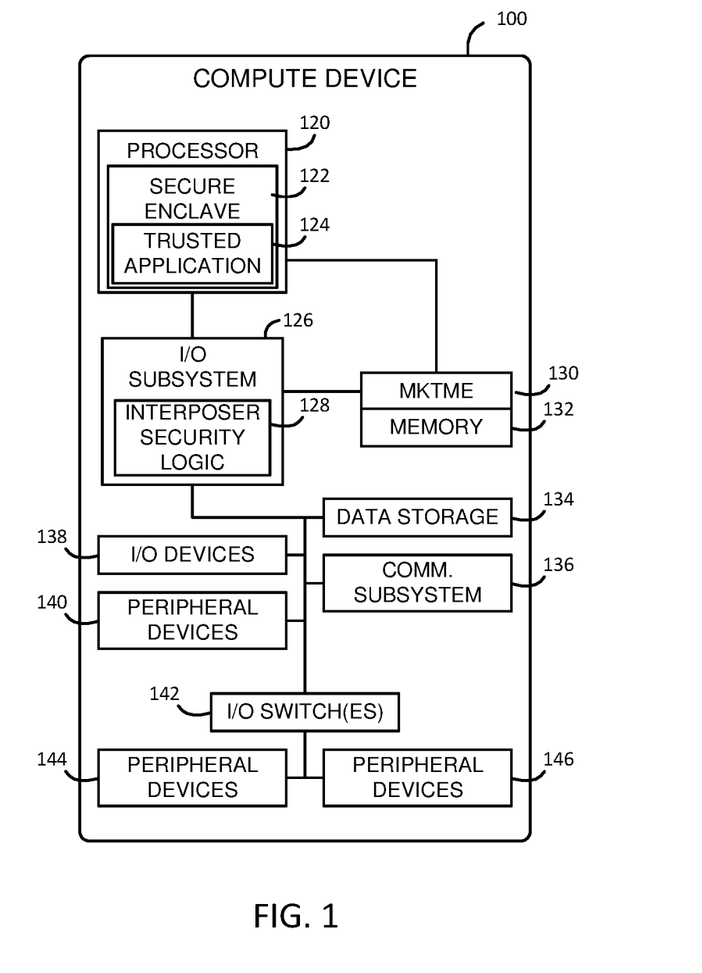
FIG. 1 is a simplified block diagram of at least one embodiment of a compute device having an I/O subsystem for establishing a secured channel for a secure I/O data transfer.

Referring now to FIG. 1, a compute device 100 for establishing a secured channel for a secure I/O data transfer with a trusted application running on the compute device 100 includes a processor 120, an I/O subsystem 126, and one or more I/O devices 138. In use, as described further below, the I/O subsystem 126 may establish a secured channel between an application running inside a trusted execution environment (TEE) of the host processor 120 (e.g., a trusted application 124) and the I/O subsystem 126 for a secure I/O data transfer. To do so, the I/O subsystem 126 may establish a secured channel between the I/O subsystem and the trusted application 124. To do so, the I/O subsystem 126 may receive a security key that is shared with the trusted application 124 to be used to communicate with the trusted application 124. For example, in the illustrative embodiment, the I/O subsystem 126 may be configured by a basic input output system (BIOS) with the security key, which is securely shared with the trusted application 124. It should be appreciated that, although a single trusted application is shown in FIG. 1, there may be multiple trusted applications inside a trusted execution environment (TEE) of the host processor 120. In such a case, a secured channel is established between each trusted application and the I/O subsystem 126 using a respective security key that is shared between the corresponding trusted application and the I/O subsystem 126.

Additionally, the I/O subsystem 126 may further configure the secured channel based on configuration data received from the trusted application 124 via the established secured channel. For example, the configuration data may define initialization parameter, such as, but not limited to, a packet size, a header size, a header format, a format of data packets, and/or a flow control information, for I/O data that is to be transferred from the I/O subsystem 126 to the trusted application 124. In some embodiments, the configuration of the secured channel may require a power reset. In such embodiments, the interposer security logic unit 128 may configure the secured channel upon a power reset.

Once the secured channel is established, the I/O subsystem 126 may receive I/O data, from an I/O device 138 via an unsecured channel, that is to be transferred to and processed by the trusted application 124. In response to receiving the I/O data, the I/O subsystem 126 may encrypt the I/O data using the security key that is shared with the trusted application 124 and transferred the encrypted I/O data to the trusted application 124 via the secured channel. It should be appreciated that, in the illustrative embodiment, a data transfer rate of the secured channel is faster than a data transfer rate of the unsecured channel between the I/O device and the I/O subsystem to account for encryption delays. As such, the secured channel established between the I/O subsystem 126 and the trusted application 124 may provide I/O data protection without implementing hardware or software modifications to I/O devices 138.

The compute device 100 may be embodied as any type of device capable of performing the functions described herein. For example, the compute device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative compute device 100 includes the processor 120, the I/O subsystem 126, a memory 132, and a data storage device 134. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment (TEE) known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 122 may be embodied as a set of processor instruction extensions that allows the processor 120 to establish one or more secure enclaves in the memory 132. For example, the secure enclave support 122 may be embodied as Intel® Software Guard Extensions (SGX) technology. As such, in the illustrative embodiment, applications that are running in the secure enclave 122 are considered trusted applications (e.g., the trusted application 124).

The memory 132 may be embodied as any type of volatile or non-volatile memory or data storage capable of performing the functions described herein. In operation, the memory 132 may store various data and software used during operation of the compute device 100 such as operating systems, applications, programs, libraries, and drivers. As shown, the memory 132 is coupled to the processor 120 and/or the I/O subsystem 126 via a multi-key total memory encryption engine (MKTME) 130, which may be included in or otherwise coupled to a memory controller, integrated memory controller hub, or other memory interface. The MKTME 130 allows the compute device 100 to transparently encrypt the contents of the memory 132. The MKTME 130 maintains a table or other internal, protected structure with multiple encryption keys, which are used to encrypt and decrypt data as it is stored to and read from the memory 132, respectively. The encryption keys are illustratively 128-bit AES XTS keys although may be embodied as any symmetric, asymmetric, or other encryption key. The encryption key may be selected by the MKTME 130 on a per-page basis, for example based on a key identifier included in one or more otherwise unused upper bits of the physical memory page address for a particular memory access. In those embodiments, an operating system, virtual memory monitor, or other supervisory component of the compute device 100 may control access to particular memory pages by configuring one or more page tables and/or extended page tables with the appropriate key identifiers. MKTME keys may be generated by the MKTME 130, in which case they are not disclosed outside of the SoC, or may be supplied by software. In some embodiments, the MKTME 130 may include support for Intel Trusted Domain Extensions (TDX). With TDX, the MKTME 130 may accept an external "domain" key, also called a "user" or "tenant" key. The MKTME 130 may also use a default key that is self-generated to protect memory used by MKTME and Intel SGX as well as Intel TDX. Although illustrated as coupled between the memory 132 and the processor 120 and I/O subsystem 126, it should be understood that in some embodiments, the MKTME 130 may be included in the processor 120, in the I/O subsystem 126, or other component of the compute device 100.

As shown, the processor 120 is communicatively coupled to the I/O subsystem 126, which may be embodied as circuitry and/or components to facilitate input/output operations with the processor 120, the memory 132, and other components of the compute device 100. For example, the I/O subsystem 126 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. As shown, the memory 132 may be directly coupled to the processor 120, for example via an integrated memory controller hub. In some embodiments, the memory 132 may be directly coupled to the processor 110, for example via an integrated memory controller hub or a data port. The I/O subsystem 126 may further include a sideband network, secure fabric, or other secure routing support. The secure routing support may include hardware support to ensure I/O data cannot be misrouted in the I/O subsystem 126 under the influence of rogue software. Additionally, in some embodiments, the I/O subsystem 126 may form a portion of a system-on-a-chip (SoC) and be incorporated, along with the processor 120, the memory 132, and/or other components of the compute device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 132.

As shown, the I/O subsystem 126 further includes an interposer security logic unit 128. The interposer security logic unit 128 may be embodied as any hardware controller(s), component(s), or other circuitry capable of performing the functions described herein. In particular, the interposer security logic unit 128 is configured to establish a secured channel between the I/O subsystem and an application running inside a trusted execution environment (TEE) (e.g., the trusted application 124) of the compute device 100. To do so, the interposer security logic unit 128 may receive a security key that is shared with the trusted application 124 running on the host processor 120. For example, in the illustrative embodiment, the secured channel manager 220 may be configured by a basic input output system (BIOS) with the security key, which is securely shared with the trusted application 124.

Additionally, the interposer security logic unit 128 may be further configured to configure the secured channel based on configuration data received from the trusted application 124 via the secured channel. It should be appreciated that the configuration data is encrypted by the trusted application 124 using the security key that is shared between the trusted application 124 and the interposer security logic unit 128. The configuration data defines initialization parameter, such as, but not limited to, a packet size, a header size, a header format, a format of data packets, and/or a flow control information, for I/O data that is to be transferred from the I/O subsystem 126 to the trusted application 124. In response to a receipt of the encrypted configuration data, the interposer security logic unit 128 may decrypt the configuration data using the security key and configure the secured channel based on the configuration data. In some embodiments, the configuration of the secured channel may require a power reset. In such embodiments, the interposer security logic unit 128 may configure the secured channel upon a power reset.

Once the secured channel is established, the interposer security logic unit 128 is configured to receive I/O data that is to be transferred to and processed by a trusted application 124. In response to receiving the I/O data, the interposer security logic unit 128 is further configured to encrypt the I/O data using the security key that is shared with the trusted application 124 and transfer the encrypted I/O data to the trusted application 124 via the corresponding secured channel established between the interposer security logic unit 128 and the trusted application 124. In the illustrative embodiment, the interposer security logic unit 128 may be embodied as a field-programmable gate array (FPGA). It should be appreciated that, in some embodiments, the interposer security logic unit may be incorporated along the I/O path from the I/O device 138 to the processor 120.

The data storage device 134 may be embodied as any type of device or devices configured for short-term or long-term storage of data such as, for example, memory devices and circuits, memory cards, hard disk drives, solid-state drives, non-volatile flash memory, or other data storage devices. The compute device 100 also includes the communication subsystem 136, which may be embodied as any communication circuit, device, or collection thereof, capable of enabling communications between the compute device 100 and other remote devices over a computer network (not shown). The communication subsystem 136 may be embodied as any network interface card, network adapter, network controller, host fabric interface, network coprocessor, or other component that connects the compute device 100 to a computer network. The communication subsystem 136 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 136 may form a portion of an SoC and be incorporated along with the processor 120, the memory 132, the I/O subsystem 126, and/or other components of the compute device 100 on a single integrated circuit chip.

The I/O device 138 may be embodied as an I/O device of the compute device 100 that generates I/O data that may be transferred to an application running on the host processor 120. For example, in some embodiments, the I/O device 138 may include a touch screen, graphics circuitry, a graphical processing unit (GPU) and/or processor graphics, an audio device, a microphone, a camera, a keyboard, a mouse, a network interface, and/or other input/output devices, endpoints, interface devices, and/or peripheral devices. In some embodiments, the I/O device 138 may be embodied as an accelerator, which may be embodied as a field-programmable gate array (FPGA), an application-specific integrated circuit (ASIC), a graphics processor unit (GPU), a coprocessor, or other digital logic device capable of performing accelerated functions (e.g., accelerated application functions, accelerated network functions, or other accelerated functions).

As shown, the compute device 100 may further include one or more peripheral devices 140. The peripheral devices 140 may include any number of additional input/output devices, interface devices, hardware accelerators, and/or other peripheral devices. As shown, one or more of the peripheral devices 140 may be coupled to the I/O subsystem 126 via corresponding I/O switches 142. The I/O switches 142 may be embodied as PCI Express (PCIe) switches, PCIe bridges, and/or other switching or routing components of the computing device 100. Thus, the computing device 100 may include a hierarchical system of connected I/O devices, switches, buses, links, and/or other I/O components.

Figure 2:
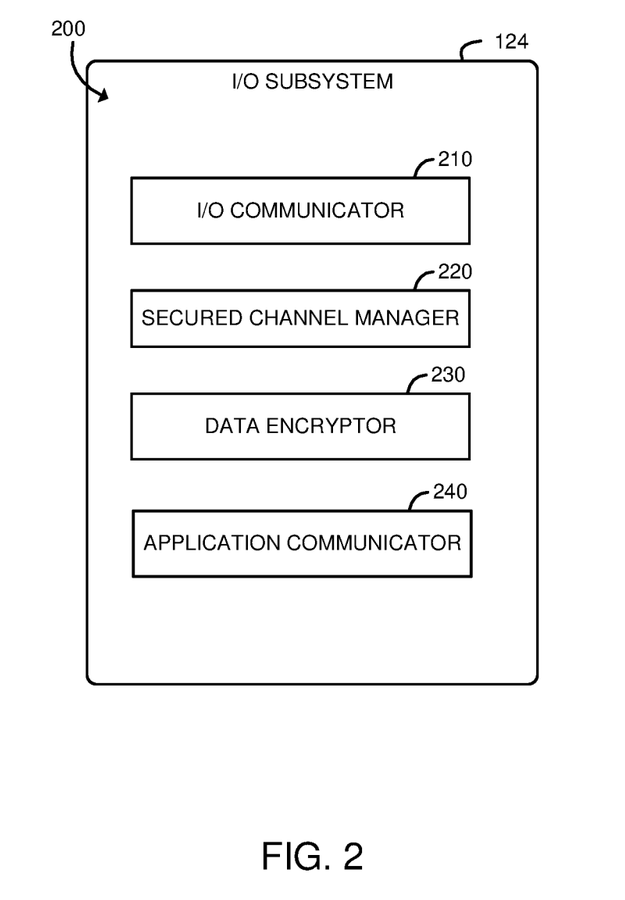
FIG. 2 is a simplified block diagram of at least one embodiment of an environment of the I/O subsystem of FIG. 1.

Referring now to FIG. 2, in an illustrative embodiment, the I/O subsystem 126 of the compute device 100 establishes an environment 200 during operation. The illustrative environment 200 includes an I/O communicator 210, a secured channel manager 220, a data encryptor 230, and an application communicator 240. The various components of the environment 200 may be embodied as hardware, firmware, software, or a combination thereof. As such, in some embodiments, one or more of the components of the environment 200 may be embodied as circuitry or collection of electrical devices (e.g., I/O communicator circuitry 210, secured channel manager circuitry 220, data encryptor circuitry 230, and/or application communicator circuitry 240). It should be appreciated that, in such embodiments, one or more of the I/O communicator circuitry 210, the secured channel manager circuitry 220, the data encryptor circuitry 230, and the application communicator circuitry 240 may form a portion of I/O subsystem 126. Additionally, in some embodiments, one or more of the illustrative components may form a portion of another component and/or one or more of the illustrative components may be independent of one another.

The I/O communicator 210 is configured to communicate with one or more I/O devices 138 to receive I/O data that is to be transferred to and processed by an application running on the host processor 120.

The secured channel manager 220 is configured to establish a secured channel between the I/O subsystem and an application running inside a trusted execution environment (TEE) (e.g., the trusted application 124) of the compute device 100. To do so, the secured channel manager 220 is configured to receive a security key that is shared with the trusted application 124. For example, in the illustrative embodiment, the secured channel manager 220 is configured by a basic input output system (BIOS) with the security key, which is securely shared with the trusted application 124. Additionally, the secured channel manager 220 is further configured to configure the established secured channel. To do so, the secured channel manager 220 receives configuration data that is encrypted using the security key from the trusted application 124 via the secured channel. For example, the configuration data may define initialization parameter, such as, but not limited to, a size of packet, a header size, a header format, a format of data packets, and/or a flow control information, for I/O data that is to be transferred from the I/O subsystem 126 to the trusted application 124. In response to a receipt of the encrypted configuration data, the secured channel manager 220 is configured to decrypt the configuration data and configure the secured channel based on the configuration data. In some embodiments, the configuration of the secured channel may require a power reset. In such embodiments, the secured channel manager 220 may configure the secured channel upon a power reset.

The data encryptor 230 is configured to encrypt the I/O data using the security key that is shared with the trusted application 124 that is to process the I/O data. As discussed above, the I/O data received from the I/O device 138 is not encrypted and is transferred via an unencrypted channel.

The application communicator 240 is configured to transmit the encrypted I/O data encrypted by the data encryptor 230 to the trusted application 124 via the secured channel. As discussed above, a secured channel is established between the I/O subsystem 126 and the trusted application 124. The encrypted I/O data is to be decrypted by the trusted application 124 using the security key to be processed. As discussed above, in some embodiments, there may be multiple applications inside a trusted execution environment (TEE) of the host processor 120. In such embodiments, the application communicator 240 is configured to transmit encrypted I/O data, which is encrypted using a security key that is shared with a corresponding trusted application, to the corresponding trusted application via a secured channel that is established between the corresponding trusted application and the I/O subsystem 126.

Figure 3:
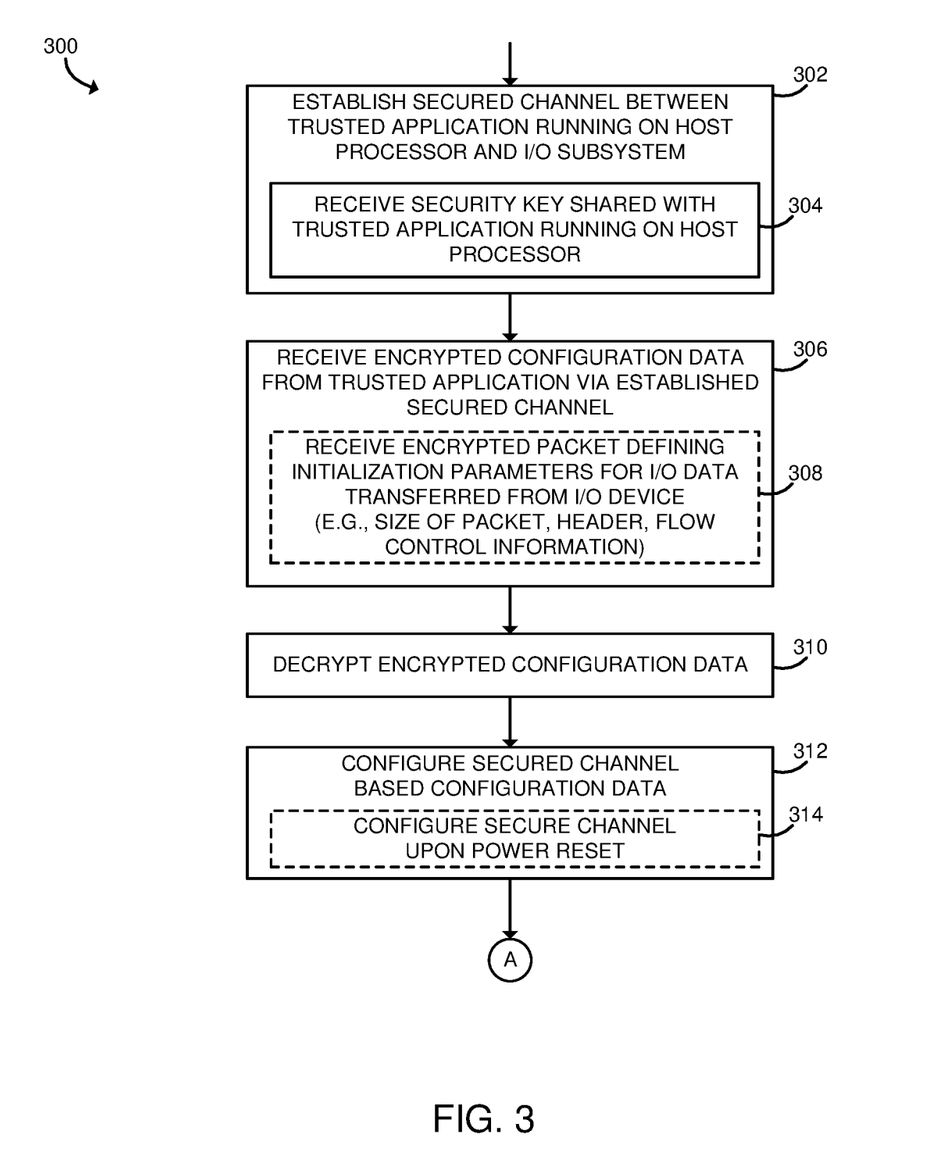
FIGS. 3 and 4 are a simplified flow diagram of at least one embodiment of a method for performing a secure I/O data transfer between the I/O subsystem and a trusted application running on a host processor of the compute device of FIG. 1 that may be executed by the I/O subsystem of the compute device of FIGS. 1 and 2.
Figure 4:
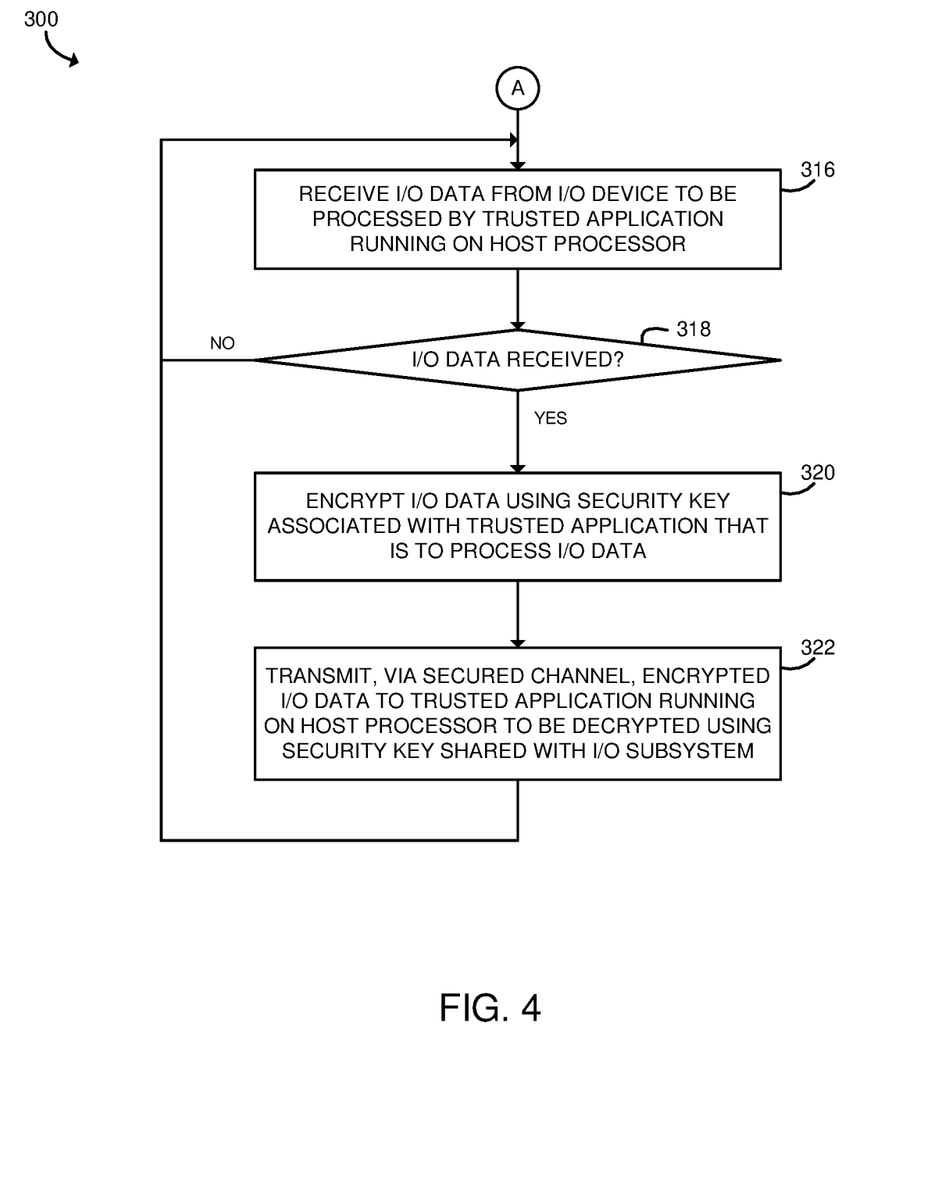

Referring now to FIGS. 3 and 4, in use, the interposer security logic unit 128 of the I/O subsystem 126 of the compute device 100 may execute a method 300 for performing a secure I/O data transfer between the I/O subsystem and a trusted application 124 running inside a trusted execution environment (TEE) of the host processor 120 of the compute device 100 (e.g., the trusted application 124). It should be appreciated that, in some embodiments, the operations of the method 300 may be performed by one or more components of the environment 200 of the I/O subsystem 126 of the compute device 100 as shown in FIG. 2. The method 300 begins in block 302, in which the interposer security logic unit 128 establishes a secured channel between the I/O subsystem 126 and a trusted application 124 running on the host processor 120 of the compute device 100. To do so, the interposer security logic unit 128 receives a security key that is shared with the trusted application 124 running on the host processor 120, as indicated in block 304. For example, in the illustrative embodiment, a basic input output system (BIOS) configures the interposer security logic unit 128 with the security key and securely shares the security key with the trusted application 124. However, it should be appreciated that, in other embodiments, the interposer security logic unit 128 may be configured by any trusted execution environment (TEE) of the compute device 100.

In block 306, the interposer security logic unit 128 receives encrypted configuration data that is encrypted using the security key from the trusted application 124 via the established secured channel. In some embodiments, the configuration data may define initialization parameters for an I/O data transferred from an I/O device 138, as indicated in block 308. For example, the initialization parameters may include, but not limited to, a size of a packet, a header size, a header format, a format of data packets, and/or a flow control information of the I/O data transfer from an I/O device 138. It should be appreciated that the initialization parameters are not shared with the I/O device 138.

Subsequently, the interposer security logic unit 128 decrypts the encrypted configuration data using the security key in block 310 and configures the secured channel based on the configuration data. In some embodiments, the interposer security logic unit 128 may configure the secured channel upon a power reset.

Once the secured channel is established and configured, the method 300 advances to block 316 of FIG. 4. In block 316, the interposer security logic unit 128 receives I/O data from an I/O device 138 that is to be transmitted to and processed by the trusted application 124 running on the host processor 120. It should be appreciated that the I/O data from the I/O device 138 is received via a channel that is not encrypted. In particular, the I/O data may be received over a relatively low-speed full-duplex I/O link, such as a serial peripheral interface (SPI) link.

If the interposer security logic unit 128 determines that I/O data has not been received in block 318, the method 300 loops back to block 316 to continue waiting for I/O data from an I/O device 138. If, however, the interposer security logic unit 128 determines that I/O data has been received, the method 300 advances to block 320.

In block 320, the interposer security logic unit 128 encrypts the received I/O data using the security key associated with the trusted application 124 that is to process the I/O data. As discussed above, the security key is shared between the interposer security logic unit 128 and the trusted application 124 to encrypt and decrypt the I/O data for a secure I/O data transfer from the I/O device 138.

Subsequently, in block 322, the interposer security logic unit 128 transmits the encrypted I/O data to the trusted application 124 running on the host processor 120 to be decrypted using the security key shared with the interposer security logic unit 128. It should be appreciated that, in the illustrative embodiment, the secured channel is a full-duplex communication channel and has a faster data transfer rate compared to the unsecured channel between the I/O device 138 and the I/O subsystem 126 to account for encryption delays.

Figure 5:
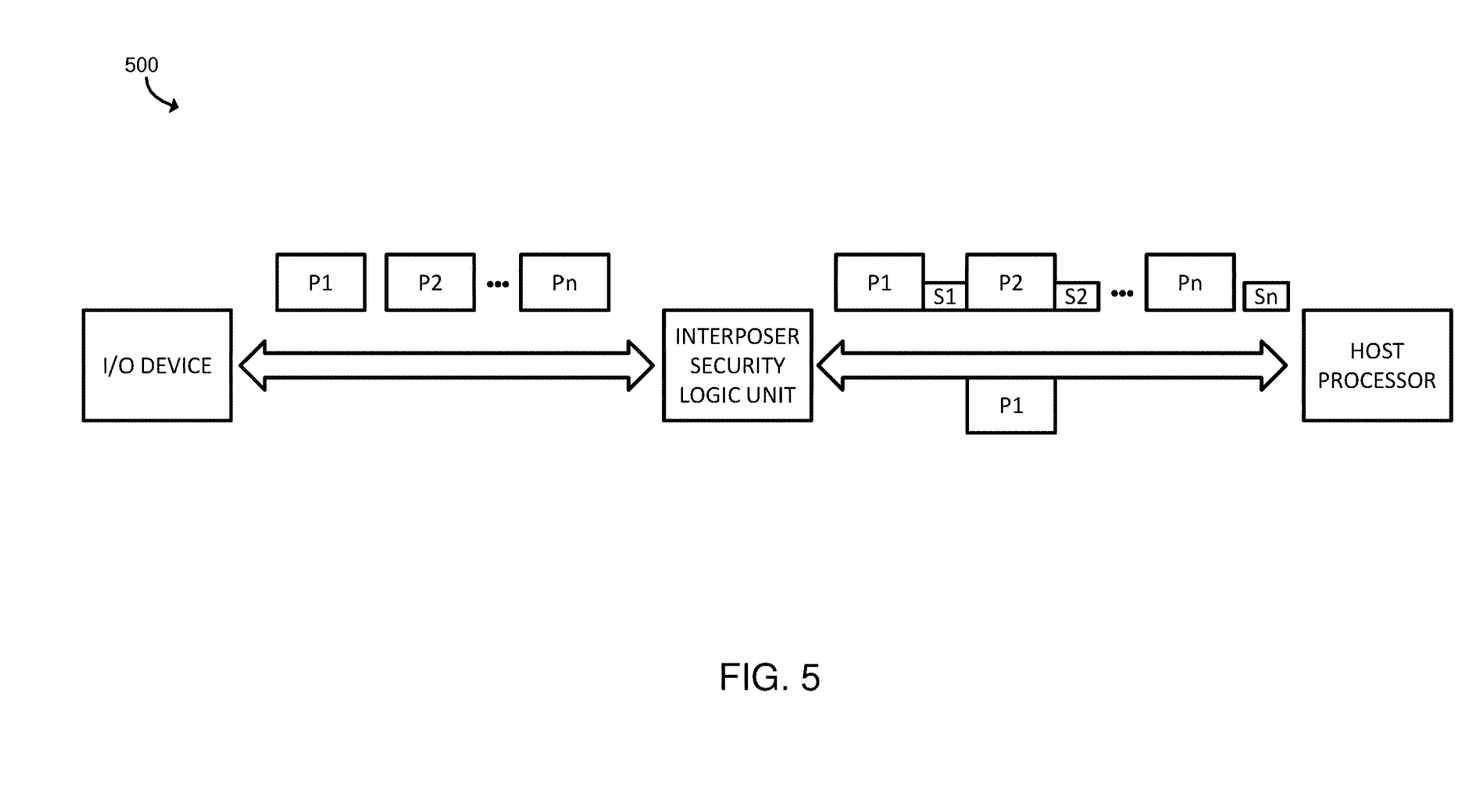
FIG. 5 is a simplified block diagram of at least one embodiment of a method for supporting full duplex communication channels between an I/O device and the I/O subsystem and between the I/O subsystem and the host processor of the compute device of FIG. 1.

Specifically, as shown in FIG. 5, the interposer security logic unit 128 sends a special packet (e.g., S1, S2, . . . Sn) interleaved with each packet (i.e., encrypted I/O data) indicating additional information required for encryption and full duplex missed data (e.g., by adding a NULL packet, as shown in TABLE 1). As shown in TABLE 1, it should be appreciated that the interposer security logic unit 128 may insert NULL packets in full-duplex communications with the host trusted application 124 to account for encryption delays or latency. Communications between the interposer security logic unit 128 and the I/O device 138 may not include any NULL packets, allowing transparent use of existing I/O devices 138. In response, the host trusted application 124 may use the extra information included the special packet to decrypt the packet. Additionally, the host trusted application 124 may shift received packets (e.g., by deleting NULL packets) and merge the data from S1. In other words, when the host trusted application 124 receives the TX and RX packet with a delay shift, the host trusted application 124 may un-shift by deleting NULL RX packets, such that a driver software would not need to be changed.

TABLE 1

| Cycle | Host | Interposer Security Logic Unit | I/O Device |
|---|---|---|---|
| 1 | TX0\|NULL | NULL\|NULL | NULL\|NULL |
| 2 | TX1\|NULL | TX0\|NULL | NULL\|NULL |
| 3 | TX2\|NULL | TX1\|NULL | NULL\|NULL |
| 4 | TX3\|NULL | TX2\|NULL | TX0\|RX0 |
| 5 | TX4\|NULL | TX3\|NULL | TX1\|RX1 |
| 6 | TX5\|NULL | TX4\|RX0 | TX2\|RX2 |
| 7 | TX6\|RX0 | TX5\|RX1 | TX3\|RX3 |
| . . . | | | |

For example, again referring to TABLE 1, in cycle 1 the host transmits packet TX0 to the interposer security logic unit 128. As described above, packets provided by the trusted host application 124 are encrypted. Thus, the interposer security logic unit 128 starts a decryption process on packet TX0, which in the illustrative embodiment includes three cycles of latency, for example to receive the packet over an SPI link, perform a cryptographic operation, and transmit the result over another SPI link. As the decryption process is started, the interposer security logic unit 128 transmits a NULL packet back over the full-duplex link to the host. The interposer security logic unit 128 also exchanges NULL packets with the I/O device 138 over a full-duplex link.

Continuing that example, in cycle 2, the host transmits packet TX1 to the interposer security logic unit 128, and the interposer security logic unit 128 transmits a NULL packet back to the host. In cycle 2, the interposer security logic unit 128 exchanges NULL packets with the I/O device 138 over the full-duplex link. This process continues with cycle 3.

In cycle 4, the host transmits packet TX3 to the interposer security logic unit 128, and the interposer security logic unit 128 transmits a NULL packet back to the host. By cycle 4, the packet TX0 has completed the decryption process. Thus, in cycle 4 the interposer security logic unit 128 transmits the packet TX0 over the full-duplex link to the I/O device 138. The packet TX0 transmitted to the I/O device 138 is encrypted, and in cycle 4 the I/O device 138 transmits a packet RX0 to the interposer security logic unit 128 over the full-duplex link. As described above, packets provided by the I/O device 138 are not encrypted. Thus, the interposer security logic unit 128 starts an encryption process on packet RX0, which in the illustrative embodiment includes three cycles of latency as described above. Note that packets TX0 and RX0 are exchanged over the full-duplex link with the I/O device 138 in the same cycle.

This process of shifting received packets by inserting NULL packets continues. The encryption process of packet RX0 is completed by cycle 7, in which the interposer security logic unit 128 transmits the encrypted packet RX0 over the full-duplex link to the host. Upon receipt, the host application 124 may un-shift the received data, for example by deleting NULL packets received from the interposer security logic unit 128. In some embodiments, the un-shifted data may be processed transparently by device drivers or other software unaware of the interposer security logic unit 128. In such embodiments, it is assumed that the device drivers and other middleware do not perform any processing of data in clear. For such embodiments, the security is considered 'transparent' (i.e., the device drivers are not aware of the security feature). It should be appreciated that, in other embodiments where the device drivers and other middleware processes data, the functionalities of the device drivers and other middleware need to be moved to a TEE in order to process the data in clear.

EXAMPLES

Illustrative examples of the technologies disclosed herein are provided below. An embodiment of the technologies may include any one or more, and any combination of, the examples described below.

Example 1 includes a compute device for secure I/O data transfer, the compute device comprising a processor to execute a trusted application; an input/output (I/O) device; and an I/O subsystem to establish a secured channel between the I/O subsystem and a trusted application running on the compute device; receive, in response to an establishment of the secured channel, I/O data from the I/O device via an unsecured channel; encrypt, in response to a receipt of the I/O data, the I/O data using a security key associated with the trusted application that is to process the I/O data; and transmit the encrypted I/O data to the trusted application via the secured channel, wherein the secured channel has a data transfer rate that is higher than a data transfer rate of the unsecured channel between the I/O device and the I/O subsystem.

Example 2 includes the subject matter of Example 1, and wherein to establish the secured channel comprises to receive the security key shared with the trusted application running on the compute device.

Example 3 includes the subject matter of any of Examples 1 and 2, and wherein to encrypt the I/O data comprises to encrypt, in response to a receipt of the I/O data, the I/O data using a security key.

Example 4 includes the subject matter of any of Examples 1-3, and wherein the I/O subsystem is further to receive encrypted configuration data from the trusted application via the secured channel; decrypt the encrypted configuration data; and configure the secured channel based on the decrypted configuration data.

Example 5 includes the subject matter of any of Examples 1-4, and wherein to configure the secured channel comprises to configure the secured channel upon a power reset.

Example 6 includes the subject matter of any of Examples 1-5, and wherein the trusted application running inside a trusted execution environment (TEE) of the compute device.

Example 7 includes the subject matter of any of Examples 1-6, and wherein the secured channel is a full-duplex communication channel.

Example 8 includes the subject matter of any of Examples 1-7, and wherein to receive the I/O data comprises to receive, in response to an establishment of the secured channel, I/O data via a communication channel between the I/O subsystem and the I/O device, wherein the communication channel is not encrypted.

Example 9 includes the subject matter of any of Examples 1-8, and wherein to transmit the encrypted I/O data comprises to transmit metadata associated with the encrypted I/O data to the trusted application via the secured channel, wherein the data transfer rate of the secured channel is based on a size of the metadata.

Example 10 includes a method for secure I/O data transfer, the method comprising establishing, by the I/O subsystem of a compute device, a secured channel between the I/O subsystem and a trusted application running on the compute device; receiving, in response to establishing the secured channel and by the I/O subsystem, I/O data from an I/O device via an unsecured channel; encrypting, in response to receiving the I/O data and by the I/O subsystem, the I/O data using a security key associated with the trusted application that is to process the I/O data; and transmitting, by the I/O subsystem, the encrypted I/O data to the trusted application via the secured channel, wherein the secured channel has a data transfer rate that is higher than a data transfer rate of the unsecured channel between the I/O device and the I/O subsystem.

Example 11 includes the subject matter of Example 10, and wherein establishing the secured channel comprises receiving, by the I/O subsystem, the security key shared with the trusted application running on the compute device.

Example 12 includes the subject matter of any of Examples 10 and 11, and wherein encrypting the I/O data comprises encrypting, in response to receiving the I/O data and by the I/O subsystem, the I/O data using a security key.

Example 13 includes the subject matter of any of Examples 10-12, and further including receiving, by the I/O subsystem, encrypted configuration data from the trusted application via the secured channel; decrypting, by the I/O subsystem, the encrypted configuration data; and configuring, by the I/O subsystem, the secured channel based on the decrypted configuration data.

Example 14 includes the subject matter of any of Examples 10-13, and wherein configuring the secured channel comprises configuring the secured channel upon a power reset.

Example 15 includes the subject matter of any of Examples 10-14, and wherein the trusted application running inside a trusted execution environment (TEE) of the compute device.

Example 16 includes the subject matter of any of Examples 10-15, and wherein the secured channel is a full-duplex communication channel.

Example 17 includes the subject matter of any of Examples 10-16, and wherein receiving the I/O data comprises receiving, in response to establishing of the secured channel, I/O data via a communication channel between the I/O subsystem and the I/O device, wherein the communication channel is not encrypted.

Example 18 includes the subject matter of any of Examples 10-17, and wherein transmitting the encrypted I/O data comprises transmitting, by the I/O subsystem, metadata associated with the encrypted I/O data to the trusted application via the secured channel, wherein the data transfer rate of the secured channel is based on a size of the metadata.

Example 19 includes one or more machine-readable storage media comprising a plurality of instructions stored thereon that, in response to being executed, cause a compute device to establish a secured channel between the I/O subsystem and a trusted application running on the compute device; receive, in response to an establishment of the secured channel, I/O data from the I/O device via an unsecured channel; encrypt, in response to a receipt of the I/O data, the I/O data using a security key associated with the trusted application that is to process the I/O data; and transmit the encrypted I/O data to the trusted application via the secured channel, wherein the secured channel has a data transfer rate that is higher than a data transfer rate of the unsecured channel between the I/O device and the I/O subsystem.

Example 20 includes the subject matter of Example 19, and further including a plurality of instructions that in response to being executed cause the compute device to receive encrypted configuration data from the trusted application via the secured channel; decrypt the encrypted configuration data; and configure the secured channel based on the decrypted configuration data.

The invention claimed is:

1. An apparatus comprising:
a processor to execute a trusted application;
an input/output (I/O) device; and
an I/O subsystem circuitry to:
   establish a secured channel between the I/O subsystem circuitry and the trusted application running on the apparatus, wherein to establish the secured channel comprises to receive a security key shared with the trusted application running on the apparatus;
   receive, in response to an establishment of the secured channel, I/O data from the I/O device via an unsecured channel, wherein the I/O data is received via a communication channel between the I/O subsystem circuitry and the I/O device, wherein the communication channel is not encrypted;
   encrypt, in response to a receipt of the I/O data, the I/O data using the security key shared with the trusted application that is to process the I/O data, wherein the encrypted I/O data is associated with and defines initialization parameters that include flow control information relating to the I/O data and further include one or more of a packet size, a header size, or a header format, wherein the packet size relates to a packet that includes the encrypted I/O data and information relating to full-duplex communication; and
   transmit the encrypted I/O data to the trusted application via the secured channel, wherein the secured channel has a data transfer rate that is higher than a data transfer rate of the unsecured channel between the I/O device and the I/O subsystem circuitry, wherein to transmit the encrypted I/O data comprises to transmit metadata associated with the encrypted I/O data to the trusted application via the secured channel, wherein the data transfer rate of the secured channel is based on a size of the metadata.

2. The apparatus of claim 1, wherein to encrypt the I/O data comprises to encrypt, in response to an additional receipt of additional I/O data, the additional I/O data using the security key.

3. The apparatus of claim 1, wherein the I/O subsystem circuitry is further to:
receive encrypted configuration data from the trusted application via the secured channel;
decrypt the encrypted configuration data; and configure the secured channel based on the decrypted configuration data.

4. The apparatus of claim 3, wherein to configure the secured channel comprises to configure the secured channel upon a power reset.

5. The apparatus of claim 1, wherein the trusted application runs inside a trusted execution environment (TEE) of the apparatus.

6. The apparatus of claim 1, wherein the secured channel is a full-duplex communication channel.

7. A method comprising:

establishing, by an input/output (I/O) subsystem circuitry of a computing device, a secured channel between the I/O subsystem circuitry and a trusted application running on the computing device, wherein establishing the secured channel comprises receiving, by the I/O subsystem circuitry, a security key shared with the trusted application running on the computing device;

receiving, in response to establishing the secured channel and by the I/O subsystem circuitry, I/O data from an I/O device via an unsecured channel, wherein the I/O data is received via a communication channel between the I/O subsystem circuitry and the I/O device, wherein the communication channel is not encrypted;

encrypting, in response to receiving the I/O data and by the I/O subsystem circuitry, the I/O data using the security key shared with the trusted application that is to process the I/O data, wherein the encrypted I/O data is associated with and defines initialization parameters that include flow control information relating to the I/O data and further include one or more of a packet size, a header size, or a header format, wherein the packet size relates to a packet that includes the encrypted I/O data and information relating to full-duplex communication; and transmitting, by the I/O subsystem circuitry, the encrypted I/O data to the trusted application via the secured channel, wherein the secured channel has a data transfer rate that is higher than a data transfer rate of the unsecured channel between the I/O device and the I/O subsystem circuitry, wherein to transmit the encrypted I/O data comprises to transmit metadata associated with the encrypted I/O data to the trusted application via the secured channel, wherein the data transfer rate of the secured channel is based on a size of the metadata.

8. The method of claim 7, wherein encrypting the I/O data comprises encrypting, in response to an additional receipt of additional I/O data, the additional I/O data using the security key.

9. The method of claim 7, further comprising:

receiving, by the I/O subsystem circuitry, encrypted configuration data from the trusted application via the secured channel;

decrypting, by the I/O subsystem circuitry, the encrypted configuration data; and configuring, by the I/O subsystem circuitry, the secured channel based on the decrypted configuration data.

10. The method of claim 9, wherein configuring the secured channel comprises configuring the secured channel upon a power reset.

11. The method of claim 7, wherein the trusted application runs inside a trusted execution environment (TEE) of the computing device.

12. The method of claim 7, wherein the secured channel is a full-duplex communication channel.

13. One or more non-transitory machine-readable storage media comprising a plurality of instructions stored thereon that, in response to being executed, cause a computing device to:

establish a secured channel between an input/output (I/O) subsystem circuitry and a trusted application running on the computing device, wherein to establish the secured channel comprises to receive, by the I/O subsystem circuitry, a security key shared with the trusted application running on the computing device;

receive, in response to an establishment of the secured channel, I/O data from an I/O device via an unsecured channel, wherein the I/O data is received via a communication channel between the I/O subsystem circuitry and the I/O device, wherein the communication channel is not encrypted;

encrypt, in response to a receipt of the I/O data, the I/O data using the security key shared with the trusted application that is to process the I/O data, wherein the encrypted I/O data is associated with and defines initialization parameters that include flow control information relating to the I/O data and further include one or more of a packet size, a header size, or a header format, wherein the packet size relates to a packet that includes the encrypted I/O data and information relating to full-duplex communication; and transmit the encrypted I/O data to the trusted application via the secured channel, wherein the secured channel has a data transfer rate that is higher than a data transfer rate of the unsecured channel between the I/O device and the I/O subsystem circuitry, wherein to transmit the encrypted I/O data comprises to transmit metadata associated with the encrypted I/O data to the trusted application via the secured channel, wherein the data transfer rate of the secured channel is based on a size of the metadata.

14. The one or more non-transitory machine-readable storage media of claim 13, further comprising a plurality of instructions that in response to being executed cause the computing device to:

receive encrypted configuration data from the trusted application via the secured channel;

decrypt the encrypted configuration data; and configure the secured channel based on the decrypted configuration data.

* * * * *